Figure 1:
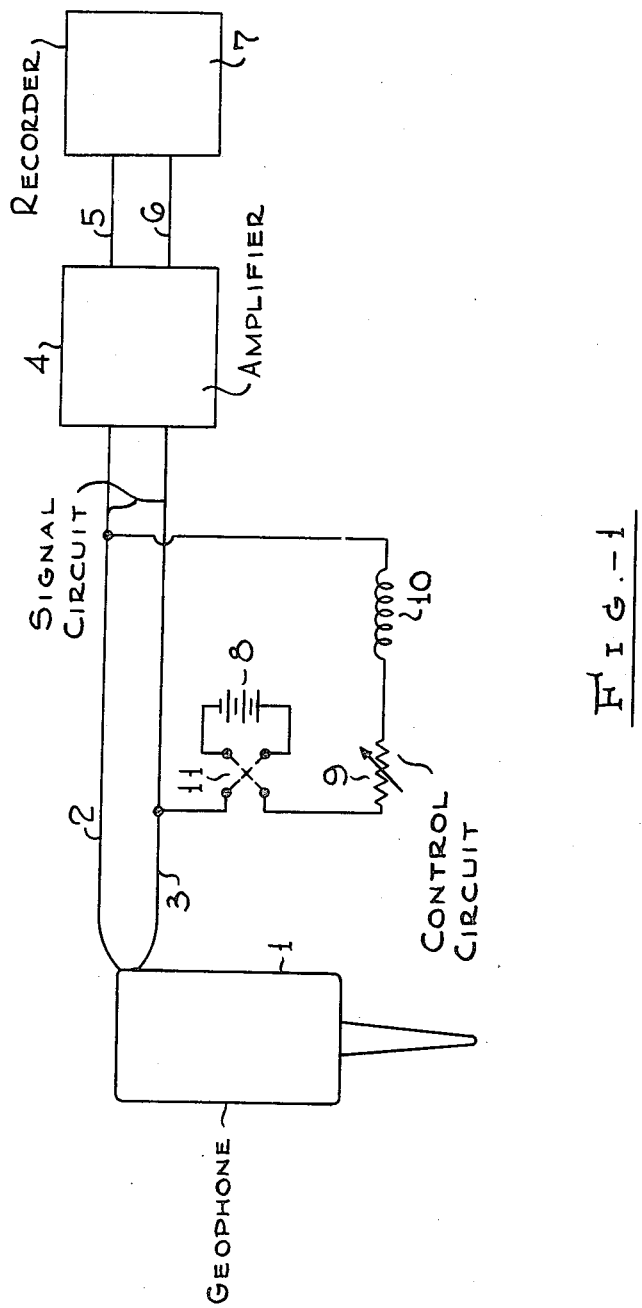

June 17, 1952     A. A. CHERNOSKY     2,600,967
LOW-FREQUENCY VIBRATIONAL PICKUP
Filed June 5, 1948     2 SHEETS—SHEET 2

Allen A. Chernosky Inventor
By W. U. T Hilmar Attorney

UNITED STATES PATENT OFFICE 2,600,967

LOW-FREQUENCY VIBRATIONAL PICKUP

Allen A. Chernosky, Houston, Tex., assignor, by mesne assignments, to Standard Oil Development Company, Elizabeth, N. J., a corporation of Delaware Application June 5, 1948, Serial No. 31,300

11 Claims. (Cl. 171—209)

This invention relates to an improved apparatus adapted to transmit low vibrational frequencies. In particular the invention relates to an improved geophone or seismic pickup suitable for transmitting seismic energy having frequencies as low as about 1 or 2 cycles per second. The present invention therefore comprises improved apparatus for use in seismic prospecting.

The science of seismic exploration comprises the steps of setting up seismic waves in the earth which are directed so as to be reflected or refracted from substrata in the earth. By receiving or picking up seismic waves reflected or refracted from substrata in the earth, it is possible to determine the depth of substrata and other geological information. The apparatus employed in seismic exploration to receive or pick up the seismic wave energy is generally called a geophone or a seismic pickup. These geophones are devices suitable for converting the mechanical vibrations of the earth, imparted by seismic wave energy, into electrical energy which may be amplified, filtered, and recorded as desired. Insofar as a substantial portion of the vibrational energy the geophones must pick up is of very low frequency, it is apparent that these geophones must be capable of transmitting extremely low frequencies. It is often desirable to employ a geophone having a frequency response as low as 1 or 2 cycles per second. It is therefore the principal object of this invention to provide an improved geophone apparatus capable of transmitting frequencies of this range.

In conventional geophones a coil is supported by springs in a magnetic field. Consequently when vibrations are imparted to the geophone the spring-supported coil will move in the magnetic field generating electromotive forces which may be amplified and recorded as desired. The characteristics of the spring-supported moving coil of such a geophone may be expressed as $$F = \frac{1}{2\pi}\sqrt{\frac{K}{M}}$$

or $$F = \frac{1}{2\pi}\sqrt{\frac{Kg}{W}}$$

in which F equals the frequency, K is the spring constant equal to the force per unit of distortion of the spring, and M is the mass of the moving element equal to the weight of the spring W divided by the acceleration of gravity $g$. Therefore, as expressed by this formula, the frequency characteristic of the spring-supported moving coil increases with increasing strength or rigidity of the spring and decreases with increasing mass of the spring-supported coil. It will be appreciated that the limitations imposed by the strength of the spring required and the mass of the spring-supported coil will limit the frequency response obtainable. Thus, a spring must be used of sufficient strength to at least support the mass of the moving coil and again the mass of the moving coil cannot be too greatly increased. One further limitation exists which may be noted. In the equations given the ratio W over K is the static deflection of the spring due to the weight of the vibrating mass under standard gravity conditions. It is therefore possible to substitute the symbol $d$ for the ratio of W over K in the above equation as follows:

$$F_0 = \frac{1}{2\pi}\sqrt{\frac{g}{d}}$$

Solving this equation for $d$ results in the expression:

$$d = \frac{g}{4\pi^2 F_0^2}$$

If the value 32.2 feet/second$^2$ is used for $g$ and if a frequency of 10 cycles per second is used for $F_0$, it is found that the deflection of the spring is 0.097 inch or roughly $\frac{1}{10}$ of an inch. It is evident from the formula that as the frequency is decreased the deflection $d$ increases. Solving this equation for a frequency of 1 cycle per second it is found that the deflection required is 9.8 inches, while for a frequency of $\frac{1}{10}$ of a cycle per second the deflection would be 980 inches. From these considerations it may be seen that even though it were possible to sufficiently reduce the strength of the spring and to increase the mass of the moving coil itself, nevertheless the deflection required for low frequency response would be so great as to go beyond the practical space limitations of geophone construction. A further problem connected with attempting to reduce the strength of the spring or to increase the mass of the moving element is that the resulting geophone would be unduly fragile and would be subject to the danger of permanently distorting the spring. It is therefore a further and more explicit object of this invention to provide a geophone which is sensitive to low frequencies (as well as high frequencies) and which is not unduly fragile and will not endanger permanent distortion of the spring element and yet, at the same time, is of compact size, not requiring excess deflections of the moving coil.

In accordance with the present invention a seismic pickup of geophone is constructed by employing a relatively weak spring. The mass of the moving element associated with this weak spring may be about that conventionally employed or may be somewhat greater to further increase the low frequency response. A D. C. electrical current is then impressed across the coil of the geophone to provide a magnetic field acting in conjunction with the conventional magnetic field provided in a manner to balance a portion of the static force of gravity on the mass of the moving element. By this novel provision the weakness of the spring will not endanger the permanent distortion of the spring. It is an additional feature of this invention that the moving element may be clamped when not in use by reversal of the magnetic field set up in the coil of the geophone by the D. C. electric current. A further feature of this invention is that the magnetic field provided to balance at least a portion of the static force on the mass of the moving coil may be of such a nature that the restoring force on the mass of the coil is reduced in proportion to the actual displacement of the moving element. This feature results in a further reduction in frequency beyond that obtainable by merely varying the strength of the spring or the mass of the moving coil.

Figure 2:
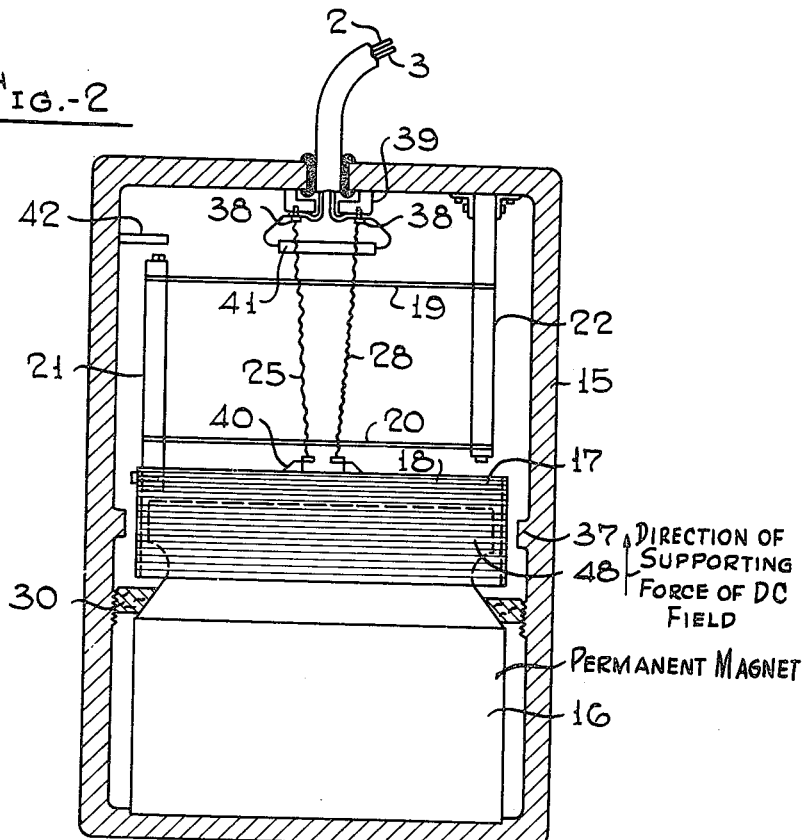
Figure 3:
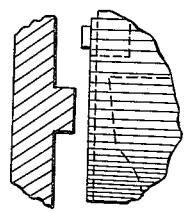

This invention and the objects of the invention will be more fully understood from a consideration of the following description in connection with the accompanying drawings in which:

Fig. 1 is a diagrammatic view of a suitable electrical and recording circuit for use in the present invention, and in which Fig. 2 is a cutaway vertical sectional view of a geophone built in accordance with this invention; and in which Figure 3 fragmentally illustrates a modification of the invention employing an irregularly wound coil and tapered pole pieces.

Referring now to Fig. 1, the entire electrical circuit employed in this invention is illustrated. The numeral 1 designates the novel geophone or seismic pickup of this invention which will be described in detail in connection with Fig. 2. Connected to the geophone are the conductors 2 and 3 which lead to an amplifier 4. It will be understood that the conductors 2 and 3 are connected to the moving coil of the galvanometer so that the electromotive force developed by movements of this coil will impose an alternating current on the amplifier 4 which will be suitably amplified. It is conventional to employ at least two stages of amplification in the amplifier 4. It is also conventional to employ filters or to adjust the amplifier characteristics to eliminate undesired frequencies. The output of the amplifier 4 is impressed on a suitable recorder indicated by the rectangle 7 through the leads 5 and 6. As heretofore described the electrical connections to the geophone 1 together with the amplifier and recorder are entirely conventional. Suitable amplifiers and recorders are well known to the art. A suitable recorder, for example, may consist of a moving coil galvanometer having a mirror attached to the coil in such a way that a light beam falling on the mirror will be reflected onto a moving strip of sensitized paper so as to record fluctuations of voltage imposed on the galvanometer. Since these elements of the circuit of Fig. 1 are conventional, no further description of these elements will be made. For clarity, the portion of the circuit heretofore described may be called the signal circuit and, as stated, is conventional in all respects.

Connected to leads 2 and 3 in parallel with the amplifier 4 and the geophone 1 is an additional circuit comprising a battery 8, a variable resistance 9, reversing switch 11, and an inductance 10. This portion of the circuit of Fig. 1 may be considered to be the control circuit to be provided and used in accordance with this invention. As will be described, the battery 8 is used as a source of D. C. voltage to impress a direct current voltage across the coil of the geophone 1. The reversing switch 11 provides means to reverse the direction of current flow in this coil. Thus, in one position of the reversing switch 11 the flow of direct current in the coil of the geophone in conjunction with the conventional magnetic field provided will set up a magnetic field acting to support the weight of the coil in the geophone. In the other of the two positions of the reversing switch 11 the magnetic field set up by the flow of direct current will cause the coil to be pulled downwardly in the geophone to rest against stops provided so as to clamp the coil against movement in transit. The variable resistance 9 may be employed in conjunction with a fixed voltage source 8 so as to variably control the quantity of direct current in the coil of the geophone. Alternatively, the variable resistance 9 may be omitted and a variable source of voltage may be employed. Inductance 10 serves the purpose of isolating the control circuit from the signal circuit. It is apparent that if a sufficiently large resistance is employed in the control circuit, the inductance 10 will not be required, or, similarly that if a sufficient large inductive impedance is used, the necessity of the resistive impedance of the resistor 9 is eliminated. In other words, if desired, a sufficiently large variable resistance 9 may be employed with a fixed battery voltage 8 so as to avoid the necessity of employing an inductance 10, or alternatively, a sufficiently large inductance 10 may be used in combination with a variable voltage source so as to avoid the necessity of using the resistance 9. In either case, however, the value of the resistance or inductance used must be sufficient to isolate the control circuit from the signal circuit.

The manner in which the flow of direct current from the control circuit described through the moving coil of the geophone is effective for the purposes outlined will be understood by reference to the remaining figure of the drawings. As shown in Fig. 2, the geophone itself comprises a suitable case or housing 15. Fixed to or made an integral part of the lower portion of the geophone case, is a projection 36. This projection may be imbedded in the earth so as to receive vibrations of the earth imparted by seismic energy. Vibrations of the projection 36 will be conducted to the geophone case 15. As will be seen, the lower part of the case comprises a portion of the magnetic path set up in the geophone so that the geophone case may conveniently be composed of an iron or steel casing. In the lower part of the casing a magnet 16 is positioned which is suitably fixed to and firmly supported by the casing. As illustrated, the magnet may be seated in a depression provided in the lower part of the inside of the geophone case, and is held there by a retaining ring 30 which may be threaded to the inside of the case so as to hold the magnet firmly within the depression at the bottom of the case. The retaining ring 30 is to be composed of non-magnetic material such as plastic or fiber. The upper end of the magnet may have a somewhat reduced cross-section finally terminating in an enlarged cross-section as illustrated to provide pole pieces. Positioned around the upper part of the magnet adjacent to the pole pieces is a coil support 17 on which is wound a suitable coil 18. This coil, for example, may consist of about 570 turns of #36 wire. The coil support is supported in its position around the upper portion of the magnet by means of the support 21 which in turn is held by the springs 19 and 20, which are supported by the support 22. The support 22 is firmly fixed to the casing 15 by means such as the clamps and screws shown. By virtue of the arrangement illustrated, vertical movement of the coil 18 is permitted, and horizontal movement is prevented. Thus, the coil is adapted to vibrate in the vertical direction between the air gap provided by the magnet poles and the extensions 37 of the case provided as paths for the lines of magnetic force extending from the bottom of the magnet through the lower part of the case, through the extensions 37 to the pole pieces of the magnet. The conductors 2 and 3 connected to the coil 18 are led through the upper part of the case through a suitable grommet as illustrated if desired. These conductors are soldered or attached to terminals 38 mounted on the insulated terminal blocks 39. Each of the conductors is then led down to a suitable terminal connection mounted on the coil support 17. The terminal supports are designated by the numeral 40 on the drawing and may, as illustrated, comprise an insulated block on which suitable connections may be made to the coil 18. It is apparent that movements of the coil should not be restricted by connection of the conductors to the coil. For this reason each of the conductors is arranged as a loose spiral of flexible wire indicated by the numerals 25 and 28. As is conventional in geophones of this type, a resistance 41 is connected in parallel across the coil 18. A suitable connection may be made as indicated at the terminal block in the upper part of the geophone case. The resistance illustrated is simply shown as the usual type of cylindrical resistance common to electronic circuits. The function of this resistance is to provide selected amounts of damping effective on the motion of the coil assembly relative to the case. This resistance element or damper is a factor in the transmissibility characteristics of the geophone and is used in conventional pickups of this type.

The operation of the apparatus shown in Fig. 2 may now be fully understood. Vibrations of the earth responsive to seismic energy transmitted through the earth will be conducted to the casing 15 at least in part through the extension 36, so that the casing of the geophone will be caused to move at the same frequency as the seismic vibrations. In the embodiment of the invention illustrated, this vibrational movement will occur in a line along the geophone case which is conventionally in a vertical direction. This movement of the casing 15 will cause the suspended coil 18 to vibrate, moving the coil crosswise to the magnetic field of the pole pieces 37 and 48. Movement of the coil in this manner will cause the conductors of the coil to cut the magnetic lines of force having a path from the lower part of the magnet 16 through the walls of the casing and through the air gap to the upper portion of the magnet. Consequently, vibration of the coil 18 in the air gap provided, will set up a signal electromotive force corresponding in frequency to the vibrations of the coil. This electromotive force will be conducted through the conductors 2 and 3 to the signal and control circuit illustrated in Fig. 1. In accordance with this invention, by adjusting the resistance 9 or the applied voltage 8 and by properly controlling the polarity of the battery 8 by means of the reversing switch 11, a direct current will also be made to flow in the coil 18. Flow of this direct current will set up a magnetic field which may be adapted to partially support the weight of the coil assembly. In other words, flow of direct current in the coil 18 may be made to repel the coil from the magnet 16, consequently diminishing the static force on the springs 19 and 20. It will be noted the non-magnetic retaining ring 30 used to hold the magnet in the case is also adapted to support the lower portion of the coil support 17 when the coil support is in its lowermost direction. Thus, if the D. C. current through coil 18 is reversed in polarity from the condition just described, a magnetic force will be set up which will pull the coil 18 toward the magnet 16 so as to cause the coil to seat on the ring 30. By this means it is possible to clamp the coil against the ring 30 when the geophone is not being used so as to prevent danger of distorting the springs 19 and 20. An upper stop 42 may also be provided so as to further limit movement of the coil assembly to prevent any possibility of permanently distorting the springs 19 and 20. In actual use, when it is desired to employ the geophone for receiving purposes sufficient current is provided in coil 18 of proper polarity to pull the coil up to a position permitting vibration up and down between the stop 42 and the ring 30. It is practical to pick the coil up to above or below a position approximately midway. In general, sufficient space is provided by the placement of stop 42 and ring 30 so that some variation in the position of the coil is possible leaving a margin for some drift in current while permitting a freedom of motion in operability.

While the springs 19 and 20 are illustrated and have been described as flat leaf springs these springs actually are of the cantilever type. The dimensions of suitable spring elements are shown in Table I. It will be noted that in the embodiment illustrated a spring length of $1\frac{5}{16}$ of an inch was required. This table shows the frequency response obtainable with different spring constructions, that is, employing springs of different material and of different widths and thicknesses.

*Table I*

| Material | Spring Length | Width | Thickness | Frequency |
|---|---|---|---|---|
| | inch | inch | | |
| Beryllium | 1 5/16 | 0.25 | 0.005 | [1] 15 |
| Do | 1 5/16 | 3/32 | .005 | 10 |
| Do | 1 5/16 | 0.05 | 0.005 | 7.8 |
| Do | 1 5/16 | 0.023 | 0.005 | 4 |
| Phosphor Bronze | 1 5/16 | 0.25 | 0.0025 | 6 |
| Shim Steel | 1 5/16 | 0.25 | [2] 0.001 | 4 |
| Do | 1 5/16 | 0.25 | 0.0008 | [2] 2.5 |

[1] Conventional operation—no control circuit.
[2] Mass of coil was increased by adding 26.5 grams of brass to coil assembly.

Referring to the table, it will be seen that if a beryllium copper spring is employed having a width of .25 inch and a thickness of .005 inch, a frequency response will be obtained without employing the novel control circuit of this invention of about 15 cycles per second. If, however, the width and thickness of this spring is materially reduced as shown in the table, and if the novel control circuit of this invention is employed, then a frequency response respectively of 10, 7.8 and 4 cycles per second is obtainable. It may be noted that with the exception of the first spring listed in Table I, that is, the beryllium copper spring having a width of .25 inch and a thickness of .005 inch, all remaining springs shown in the table were too weak to support the weight of the moving coil assembly without use of the novel control circuit of this invention. Results are also shown in Table I showing the effect of adding an additional mass to the moving coil assembly. Employing springs of shim steel 1⅝ inch long, .25 inch wide, and respectively .001 and .0008 inch thick, and by increasing the mass of the coil assembly by 26.5 grams, a frequency response of 4 and 2.5 cycles per second respectively was obtained. It is apparent therefore that employing the novel control circuit of this invention so as to balance a portion of the static force of gravity on the mass of the moving element, it is possible to obtain a geophone of improved low frequency response.

In the embodiment described heretofore, the construction of the apparatus has been such as to provide an essentially constant magnetic field throughout a reasonable range of vertical position of the coil. Consequently, the force action of the magnetic field set-up remains constant over the distance in which the coil moves. A suitable manner of getting a uniform magnetic field may be to employ as shown a coil support and coil substantially longer than the length of the pole pieces 37 and 38. Another way to get uniform magnetic flux independently of small motions of the coil is to use very broad pole pieces and a relatively short coil. However, it is occasionally desirable to set up a non-constant magnetic field. This may be achieved by tapering the pole pieces in an arrangement using a relatively short coil, or by altering the winding of the coil 18 so that the coil is not wound uniformly in an arrangement using relatively short pole pieces. Fragmental Figure 3 shown in the drawings illustrates a coil which is non-uniformly wound. As shown in Figure 3, the lower turns of the coil are more closely spaced than the upper turns of the coil. It is convenient to achieve this purpose to taper the pole pieces of the magnet 16 so as to provide a greater air gap at the upper part of the magnet and a reduced air gap at the lower part of the magnet. By this means it is possible to increase the frequency response of the geophone. Similarly, if the magnet pole pieces are tapered in the opposite direction it is possible to decrease the frequency response of the geophone. Thus, if the pole pieces of the magnet 16 are tapered so as to provide a somewhat greater air gap at the lower portion of the pole piece than at the upper portion of the pole piece, the low frequency response of the geophone will be improved. This modification of the invention is illustrated in fragmental Figure 3, showing tapering of the pole pieces of magnet 16 to provide a greater air gap at the lower portion of the pole piece than at the upper portion of the pole piece. Illustrated in Table II are typical results obtainable with a geophone embodying this invention when a non-uniform magnetic field is employed. Results are shown in Table II employing a taper providing a greater air gap at the lower part of the pole pieces and a smaller air gap at the upper part of the pole pieces.

Table II

| Material | Diameter Taper of Air Gap per Inch Length | Spring Length | Width | Thickness | Frequency |
|---|---|---|---|---|---|
| Beryllium Copper | inch 0 | inch 1⁵⁄₁₆ | 0.25 | 0.0008 | 2.5 |
| Do | 0.032 | 1⁵⁄₁₆ | 0.25 | 0.0008 | 1.6 |

¹ Mass of coil was increased by adding 26.5 grams of brass to coil assembly.

The first result in the table shows the frequency response obtainable using a constant magnetic flux field and employing no taper in the air gap in which the coil is moved. In this case a frequency response of 2.5 cycles per second was obtainable. However, under the same conditions, provided an air gap taper was provided amounting to .032 inch per inch of air gap, a frequency response of 1.6 cycles per second was obtainable.

As described therefore, the apparatus of this invention comprises an improved geophone construction having extremely low frequency response. In accordance with this invention a geophone is built of conventional construction, except that the spring elements employed to support the moving coil of the geophone are of reduced weight and strength. The mass of the moving coil element may be increased beyond that ordinarily used. The strength of the spring and the mass of the coil element are characterized by the fact that the springs will not alone support the mass of the coil element. By employing a control circuit to impress a direct current in the coil of the geophone it is possible to set up a magnetic field about the coil suitable to balance in part the static force of gravity on the mass of the coil. By this means, the exceedingly weak springs employed in the geophone of this invention will be capable of supporting the coil assembly so as to be responsive to exceedingly low vibrational frequencies. The present invention contemplates using both a uniform and non-uniform magnetic field about the coil of the geophone. It is a particular feature of this invention that by using a non-uniform magnetic field, it is possible to further decrease the frequency response of the geophone.

Having now fully described this invention, what is claimed is:

1. Apparatus for converting mechanical vibrations to electrical vibrations consisting of the combination of a casing containing a magnet, a coil element positioned in the magnetic field of the magnet, spring mounted supporting means for the coil element capable of affording at least partial support for said coil element, and an electrical circuit connected to the said coil element comprising a source of direct current, whereby an electromagnetic field is developed to co-act with the magnetic field of the said magnet to supplement the said support of the spring supporting means whereby said coil element acts as an inertia element remaining substantially motionless on vibration of the casing.

2. The apparatus defined by claim 1 in which the strength of the spring supports and the mass of the coil element are characterized by inability to suspend the coil element.

3. The apparatus defined by claim 1 in which at least a portion of the magnetic field in which the coil element is supported is of non-uniform flux strength.

4. Apparatus for converting mechanical vibrations to electrical vibrations comprising in combination a housing, a magnet having a magnetic field positioned in said housing arranged to provide an annular air gap between the magnet and casing as a part of its magnetic circuit, an annular coil element positioned in the said annular air gap, spring mounted supporting means fixed to said annular coil and said housing capable of affording at least partial support for said coil element and means for applying a D. C. current to the said coil, whereby an electromagnetic field is developed adapted to co-act with the said magnetic field to supplement the action of the said spring means to suspend the coil in the air gap, and whereby said coil element acts as an inertia element remaining substantially motionless upon vibration of the casing.

5. The apparatus defined by claim 4 including means to reverse the direction of D. C. current flow through the coil, and means to variably control the amount of D. C. current passed through the coil.

6. The apparatus defined by claim 4 including a resistance element electrically connected in parallel with the said coil.

7. The apparatus defined by claim 4 in which the magnetic field in the said air gap is substantially uniform.

8. The apparatus defined by claim 4 in which the magnetic field in the said air gap is non-uniform.

9. The apparatus defined by claim 4 in which the strength of the said spring means, and the mass of the said annular coil are characterized by inability of the springs to suspend the coil element.

10. The apparatus defined by claim 4 wherein the said air gap in which the coil is positioned is tapered whereby a non-uniform magnetic field is provided in the said air gap.

11. The apparatus defined by claim 4 in which the said coil is non-uniformly wound.

ALLEN A. CHERNOSKY.

REFERENCES CITED

The following references are of record in the file of this patent:

UNITED STATES PATENTS

| Number | Name | Date |
|---|---|---|
| 1,974,422 | Hayes | Sept. 25, 1934 |
| 2,002,372 | Greentree et al. | May 21, 1935 |
| 2,316,616 | Powell | Apr. 13, 1943 |
| 2,417,077 | Hoover | Mar. 11, 1947 |